United States Patent
Ma et al.

(10) Patent No.: US 11,741,713 B2
(45) Date of Patent: Aug. 29, 2023

(54) METHOD OF DETECTING ACTION, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Caihong Ma, Beijing (CN); Guanhao Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/088,082

(22) Filed: Dec. 23, 2022

(65) Prior Publication Data

US 2023/0127015 A1 Apr. 27, 2023

(30) Foreign Application Priority Data

Mar. 15, 2022 (CN) .......................... 202210256181.9

(51) Int. Cl.
*G06V 20/40* (2022.01)
*G06V 10/44* (2022.01)
(Continued)

(52) U.S. Cl.
CPC ............ *G06V 20/41* (2022.01); *G06F 18/213* (2023.01); *G06F 18/24* (2023.01); *G06F 18/253* (2023.01); *G06V 10/44* (2022.01)

(58) Field of Classification Search
None
See application file for complete search history.

(56) References Cited

U.S. PATENT DOCUMENTS

| 2020/0218929 | A1* | 7/2020 | Li ............................ G06F 18/00 |
| 2022/0262032 | A1* | 8/2022 | Gorban .................. G06V 20/38 |

(Continued)

FOREIGN PATENT DOCUMENTS

| CN | 110602526 | 12/2019 |
| CN | 110852256 | 2/2020 |

(Continued)

OTHER PUBLICATIONS

Chinese Office Action issued in Chinese Patent Application No. 202210256181.9, dated Oct. 12, 2022.
Chinese Master's Theses Full-text Database information Science and Technology, ISSN 1674-0246, CN 11-9144/G, 4 pages (2022).
Communication issued in corresponding European Patent Application No. 22/216,478, dated Jun. 14, 2023.
(Continued)

*Primary Examiner* — Santiago Garcia
(74) *Attorney, Agent, or Firm* — Pillsbury Winthrop Shaw Pittman, LLP

(57) ABSTRACT

A method of detecting an action, an electronic device, and a storage medium. A method can include: performing a temporal action proposal on at least one target feature data obtained by a feature extraction on a plurality of target frame data of a target resource, so as to obtain at least one first candidate action proposal information; classifying target feature data corresponding to at least one first candidate action proposal interval included in the first candidate action proposal information, so as to obtain at least one classification confidence level corresponding to the at least one first candidate action proposal interval; and determining an action detection result for at least one action segment contained in the target resource according to the at least one classification confidence level corresponding to the at least one first candidate action proposal interval, wherein the action detection result includes an action category and an action period.

20 Claims, 7 Drawing Sheets

(51) Int. Cl.
  *G06F 18/25*  (2023.01)
  *G06F 18/24*  (2023.01)
  *G06F 18/213* (2023.01)

(56) References Cited

U.S. PATENT DOCUMENTS

| | | | | |
|---|---|---|---|---|
| 2022/0301211 | A1* | 9/2022 | Liu | G06N 3/0985 |
| 2022/0351486 | A1* | 11/2022 | Sato | G06V 20/70 |
| 2022/0398810 | A1* | 12/2022 | Grancharov | G06V 10/774 |
| 2023/0017135 | A1* | 1/2023 | Zlotnick | G06N 20/20 |
| 2023/0065773 | A1* | 3/2023 | Dimitriou | G06V 20/49 |

FOREIGN PATENT DOCUMENTS

| | | |
|---|---|---|
| CN | 112633384 | 4/2021 |
| CN | 113609948 | 11/2021 |
| CN | 114120180 | 3/2022 |
| WO | 2020258598 | 12/2020 |

OTHER PUBLICATIONS

A. Bagchi et al., "Hear Me Out: Fusional Approaches for Audio Augmented Temporal Action Localization", arXiv:2106.14118 (accessed on Jul. 3, 2023), pp. 1-13 (Jun. 27, 2021).

Y. Chen et al., "Boundary graph convolutional network for temporal action detection," Image and Vision Computing, vol. 109, pp. 1-11 (Feb. 2021).

B. Tang et al., "Context-BMN for Temporal Action Proposal Generation", In: Fang, L., Chen, Y., Zhai, G., Wang, J., Wang, R., Dong, W. (eds) Artificial Intelligence, CICAI 2021, Lecture Notes in Computer Science(), Springer, vol. 13069, p. 601-612 (Jan. 1, 2022).

J. Wang et al., "Complementary Boundary Estimation Network for Temporal Action Proposal Generation", Neural Processing Letters, vol. 52, No. 3, pp. 2275-2295 (2020).

M. Ramazanova et al., "OWL (Observe, Watch, Listen): Localizing Actions in Egocentric Video via Audiovisual Temporal Context", arXiv:2202.04947 (accessed on Jul. 7, 2023), pp. 1-10 (Feb. 10, 2022).

* cited by examiner

METHOD OF DETECTING ACTION, ELECTRONIC DEVICE, AND STORAGE MEDIUM

This application claims priority of Chinese Patent Application No. 202210256181.9, filed on Mar. 15, 2022, which is hereby incorporated in its entirety by reference.

TECHNICAL FIELD

The present disclosure relates to a field of an artificial intelligence technology, in particular to fields of computer vision and deep learning technologies. Specifically, the present disclosure relates to a method of detecting an action, an electronic device, and a storage medium.

BACKGROUND

Temporal Action Detection (TAD) is one of tasks in the field of computer vision. A purpose of this task is to analyze and understand a resource of an event scene, and determine an action category and an action period of an action contained in the resource. The action period includes an action start time point and an action end time point. The temporal action detection may be widely used in various fields such as video recommendation, smart security, smart home, human-computer interaction or assisted driving, etc.

SUMMARY

The present disclosure provides a method of detecting an action, an electronic device, and a storage medium.

According to an aspect of the present disclosure, a method of detecting an action is provided, including: performing a feature extraction on a plurality of target frame data of a target resource, so as to obtain at least one target feature data; performing a temporal action proposal on the at least one target feature data, so as to obtain at least one first candidate action proposal information, wherein the first candidate action proposal information includes a first candidate action proposal interval; classifying target feature data corresponding to the at least one first candidate action proposal interval, so as to obtain at least one classification confidence level corresponding to the at least one first candidate action proposal interval; and determining an action detection result for at least one action segment contained in the target resource according to the at least one classification confidence level corresponding to the at least one first candidate action proposal interval, wherein the action detection result includes an action category and an action period.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method described in the present disclosure.

According to another aspect of the present disclosure, a non-transitory computer-readable storage medium having computer instructions therein is provided, and the computer instructions are configured to cause a computer to implement the method described in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following descriptions.

An action detection for a resource with a limited duration, such as a duration of a short video, is difficult to be directly applied to a long-duration temporal action detection task with actual needs.

Embodiments of the present disclosure propose an action detection solution that has no limitation to the resource duration and that has a strong frame mobility capability. A temporal action proposal may be performed on at least one target feature data obtained by performing a feature extraction on a plurality of target frame data, so as obtain at least one first candidate action proposal information. An action classification may be performed on target feature data corresponding to at least one first candidate action proposal interval, so as to obtain at least one classification confidence level corresponding to the at least one first candidate action proposal interval. Then an action detection result for at least one action segment contained in the target resource may be determined according to the at least one classification confidence level corresponding to the at least one first candidate action proposal interval. The target resource may have an arbitrary duration, and the action detection for the target resource having an arbitrary duration may be achieved. In addition, the target resource may be various types of resources, and the action detection solution has a strong mobility.

Figure 1:
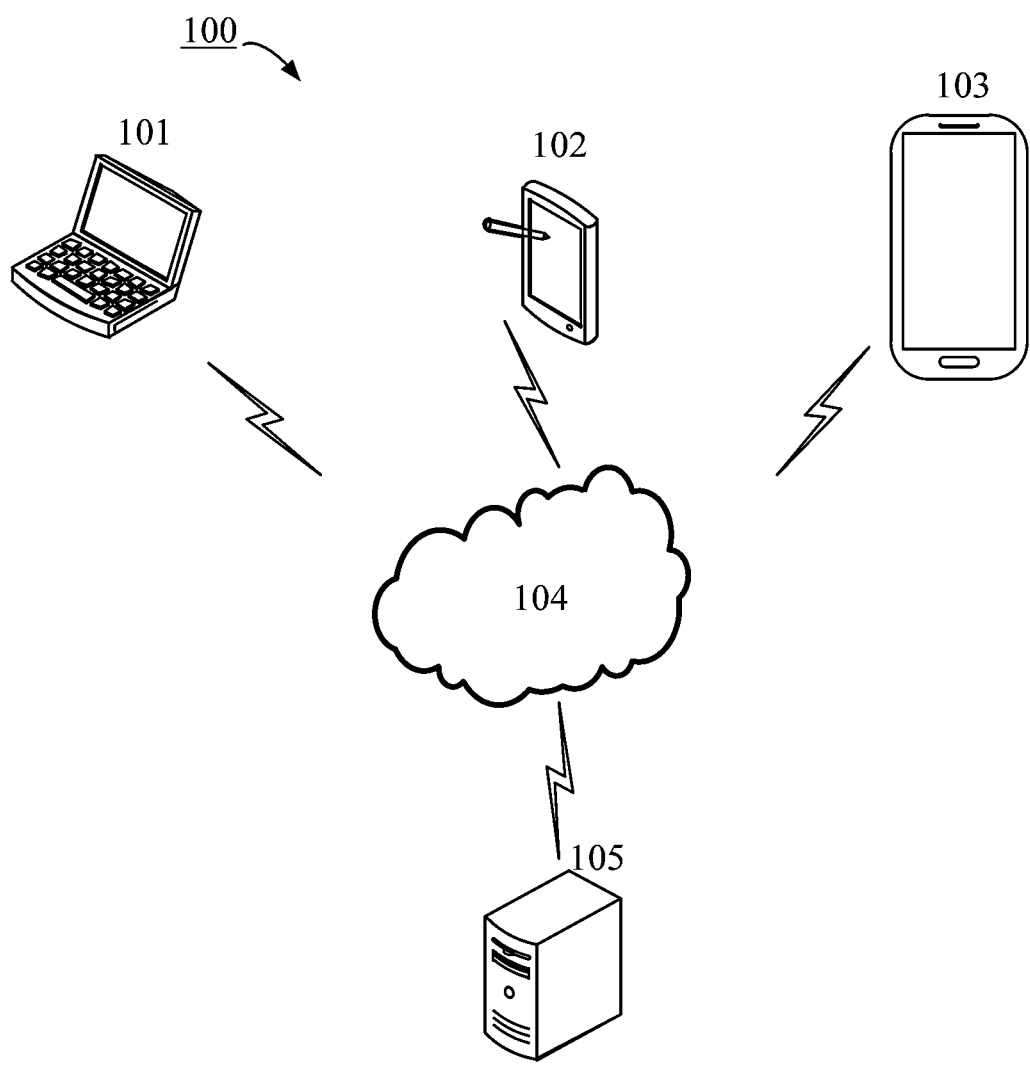
FIG. 1 schematically shows an exemplary system architecture to which a method and an apparatus of detecting an action may be applied according to embodiments of the present disclosure.

FIG. 1 schematically shows an exemplary system architecture to which a method and an apparatus of detecting an action may be applied according to embodiments of the present disclosure.

It should be noted that FIG. 1 is merely an example of a system architecture to which embodiments of the present disclosure may be applied to help those skilled in the art understand the technical content of the present disclosure, but it does not mean that embodiments of the present disclosure may not be applied to other devices, systems, environments or scenarios. For example, in other embodiments, an exemplary system architecture to which a method and an apparatus of detecting an action may be applied may include a terminal device, but the terminal device may implement the method and the apparatus of detecting the action provided in embodiments of the present disclosure without interacting with a server.

As shown in FIG. 1, a system architecture 100 according to such embodiments may include terminal devices 101, 102 and 103, a network 104, and a server 105. The network 104 is used as a medium for providing a communication link between the terminal devices 101, 102, 103 and the server 105. The network 104 may include various connection types, such as wired and/or wireless communication links, and the like.

The terminal devices 101, 102 and 103 may be used by a user to interact with the server 105 through the network 104, so as to send or receive messages, etc. The terminal devices 101, 102 and 103 may be installed with various communication client applications, such as knowledge reading applications, web browser applications, search applications, instant messaging tools, mailbox clients and/or social platform software, etc. (for example only).

The terminal devices 101, 102 and 103 may be various electronic devices having display screens and supporting web browsing, including but not limited to smartphones, tablet computers, laptop computers, desktop computers, and so on.

The server 105 may be various types of servers providing various services. For example, the server 105 may be a cloud server, also known as a cloud computing server or a cloud host, which is a host product in a cloud computing service system to solve shortcomings of difficult management and weak service scalability existing in an existing physical host and VPS (Virtual Private Server) service. The server 105 may also be a server of a distributed system or a server combined with a block-chain.

It should be noted that the method of detecting the action provided by embodiments of the present disclosure may generally be performed by the server 105. Accordingly, the apparatus of detecting the action provided by embodiments of the present disclosure may also be provided in the server 105. The method of detecting the action provided by embodiments of the present disclosure may also be performed by a server or server cluster different from the server 105 and capable of communicating with the terminal devices 101, 102, 103 and/or the server 105. Accordingly, the apparatus of detecting the action provided by embodiments of the present disclosure may also be provided in a server or server cluster different from the server 105 and capable of communicating with the terminal devices 101, 102, 103 and/or the server 105.

Alternatively, the method of detecting the action provided by embodiments of the present disclosure may generally be performed by the terminal device 101, 102 or 103. Accordingly, the apparatus of detecting the action provided by embodiments of the present disclosure may also be provided in the terminal device 101, 102 or 103.

It should be understood that a number of terminal devices, network and server in FIG. 1 are merely schematic. According to the implementation needs, any number of terminal devices, networks and servers may be provided.

It should be noted that a sequence number of each operation in the following methods is merely used to represent the operation for ease of description, and should not be regarded as indicating an execution order of each operation. Unless explicitly stated, the methods do not need to be performed exactly in the order shown.

Figure 2:
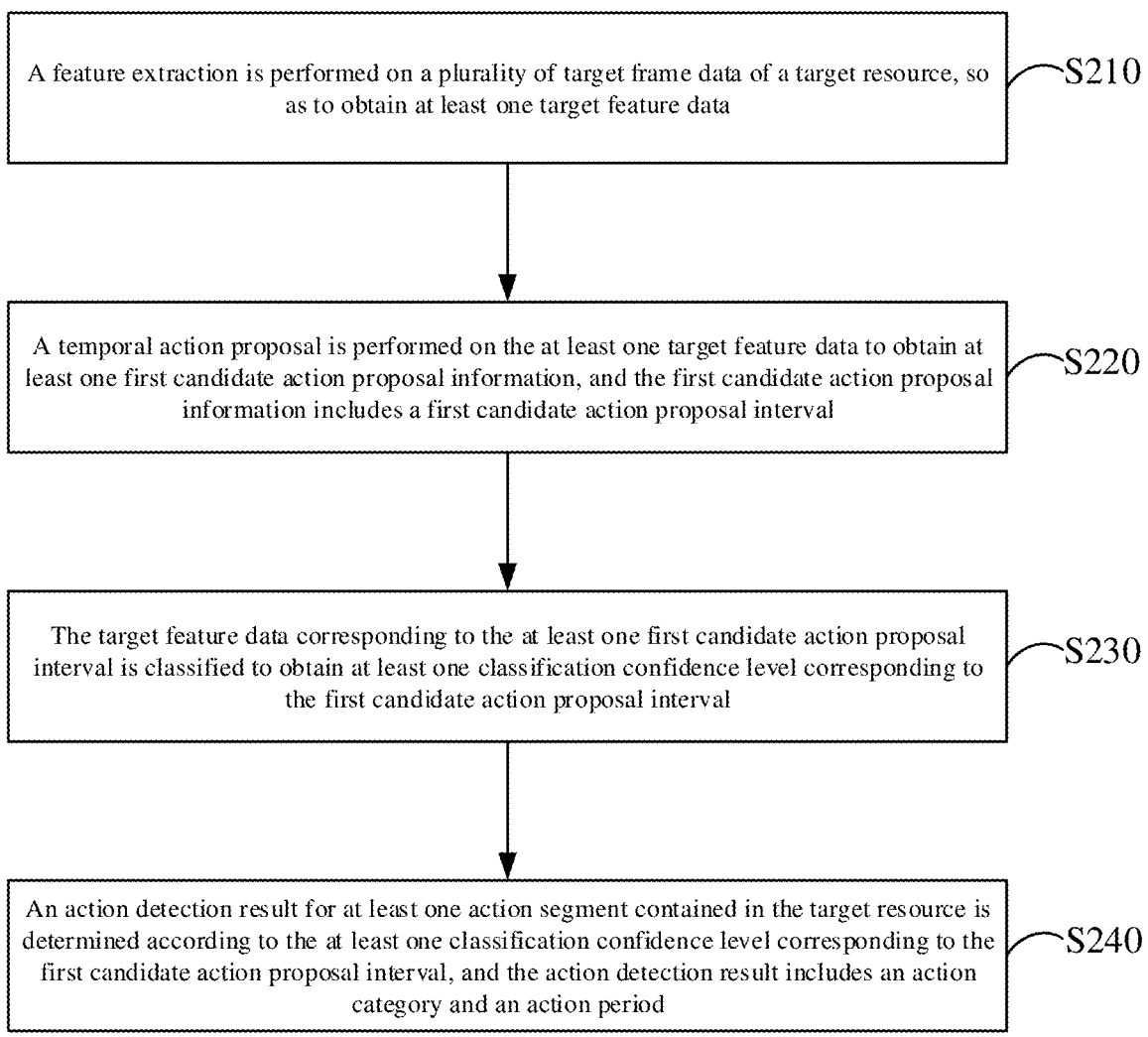
FIG. 2 schematically shows a flowchart of a method of detecting an action according to embodiments of the present disclosure.

FIG. 2 schematically shows a flowchart of a method of detecting an action according to embodiments of the present disclosure.

As shown in FIG. 2, a method 200 includes operation S210 to operation S240.

In operation S210, a feature extraction is performed on a plurality of target frame data of a target resource, so as to obtain at least one target feature data.

In operation S220, a temporal action proposal is performed on the at least one target feature data to obtain at least one first candidate action proposal information. The first candidate action proposal information includes a first candidate action proposal interval.

In operation S230, the target feature data corresponding to the at least one first candidate action proposal interval is classified to obtain at least one classification confidence level corresponding to the first candidate action proposal interval.

In operation S240, an action detection result for at least one action segment contained in the target resource is determined according to the at least one classification confidence level corresponding to the first candidate action proposal interval. The action detection result includes an action category and an action period.

According to embodiments of the present disclosure, the target resource may refer to a resource that requires an action detection. A type of the resource may include at least one selected from a video, an audio, or a text. The resource may be a resource for any event scene. The event scene may include at least one selected from a resource recommendation, an intelligent security, a human-computer interaction, an intelligent education, or an assisted driving. The resource recommendation may include at least one selected from a highlight event recommendations for a match, a highlight event recommendation for a film and television play, or a highlight event recommendation for a live stream. The resource data of the resource may include at least one selected from video data, audio data or text data. The video data may include at least one video frame data. The video data may further include at least one video frame data and at least one audio frame data. The audio data may include at least one audio frame data.

According to embodiments of the present disclosure, a duration of the target resource may be any value. The duration of the target resource may be configured according to actual service requirements, which is not limited here. For example, the target resource may be a long video that is not cropped. The target resource may include a plurality of target frame data. The plurality of target frame data have a temporal relationship with each other.

According to embodiments of the present disclosure, the temporal action proposal may be used to determine an action proposal interval information. The action proposal interval information may include an action proposal interval. The action proposal interval may include an action start time point and an action end time point. The classification confidence level may be used to indicate a confidence level of an action category.

According to embodiments of the present disclosure, the plurality of frame data may be obtained by performing a frame extraction on the target resource data of the target resource. For example, a frame extraction may be performed on the target resource according to a predetermined frame rate, so as to obtain a plurality of frame data. The predetermined frame rate may be configured according to actual service requirements, which is not limited here. For example, the predetermined frame rate may be 5 FPS (Frames Per Second). During the frame extraction process, a plurality of frame data may be extracted continuously, or a plurality of frame data may be extracted at intervals. The frame extraction method may be determined according to actual service requirements, which is not limited here.

According to embodiments of the present disclosure, target resource data of the target resource may be acquired. A frame extraction may be performed on the target resource data to obtain a plurality of target frame data. A feature extraction may be performed on the plurality of target frame data to obtain at least one target feature data. For example, a feature extraction may be performed on the plurality of target frame data to obtain respective target feature data of the plurality of target frame data. Alternatively, a feature extraction may be performed on the plurality of target frame data to obtain respective target feature data of the plurality of target frame data. At least one target frame data may be obtained according to the respective target feature data of the plurality of target frame data. For example, target frame data having an association relationship in the plurality of target frame data may be concatenated to obtain at least one target frame data.

According to embodiments of the present disclosure, the at least one target feature data may be processed by using a temporal action proposal algorithm, so as to obtain at least one first candidate action proposal information respectively corresponding to the at least one target feature data, that is, at least one first candidate action proposal information respectively corresponding to the at least one target frame data. The first candidate action proposal information may include a first candidate action proposal interval. The first candidate action proposal interval may include a first candidate action start time point and a first candidate action end time point. The at least one target feature data respectively corresponding to the at least one first candidate action proposal interval may be processed by using an action classification algorithm, so as to obtain at least one classification confidence level respectively corresponding to the at least one first candidate action proposal interval.

According to embodiments of the present disclosure, at least one target action proposal interval and the action category corresponding to the at least one target action proposal interval may be determined from the at least one first candidate action proposal interval according to the at least one classification confidence level corresponding to the at least one first candidate action proposal interval. The action detection result for the at least one action segment contained in the target resource may be determined according to the at least one target action proposal interval and the action category corresponding to the at least one target action proposal interval. For example, for each target action proposal interval in the at least one target action proposal interval, the action category corresponding to the target action interval may be determined as the action category of the action segment. The target action proposal interval may be determined as the action period of the action segment.

According to embodiments of the present disclosure, a temporal action proposal may be performed on at least one target feature data obtained by performing a feature extraction on a plurality of target frame data, so as obtain at least one first candidate action proposal information. An action classification may be performed on target feature data corresponding to at least one first candidate action proposal interval, so as to obtain at least one classification confidence level corresponding to the at least one first candidate action proposal interval. Then an action detection result for at least one action segment contained in the target resource may be determined according to the at least one classification confidence level corresponding to the at least one first candidate action proposal interval. The target resource may have an arbitrary duration, and the action detection for the target resource having an arbitrary duration may be achieved. In addition, the target resource may be various types of resources, and the action detection solution has a strong mobility.

According to embodiments of the present disclosure, the target resource may include a target video.

According to embodiments of the present disclosure, operation S210 may include the following operations.

An image feature extraction is performed on a plurality of target video frame data of the target video to obtain at least one target image feature data. An audio feature extraction is performed on the plurality of target video frame data of the target video to obtain at least one target audio feature data. The at least one target image feature data and the at least one target audio feature data are merged to obtain the at least one target feature data.

According to embodiments of the present disclosure, the target video may include a plurality of target video frame data and a plurality of target audio frame data. Target video frame data and target audio frame data having a same time point may be determined from the plurality of target video frame data and the plurality of target audio frame data. In addition, the target video may further include a plurality of target optical flow data.

According to embodiments of the present disclosure, an image feature extraction may be performed on the plurality of target video frame data respectively to obtain at least one target image feature data respectively corresponding to the at least one target video frame data. For example, the plurality of target video frame data may be processed by using an image feature extraction model, so as to obtain target image feature data respectively corresponding to the plurality of target video frame data. The image feature extraction model may be obtained by training a first predetermined deep learning model using a first training sample.

According to embodiments of the present disclosure, an audio feature extraction may be performed on the plurality of target audio frame data respectively to obtain at least one target audio feature data respectively corresponding to the at least one target audio frame data. For example, the plurality of target audio frame data may be processed by using an audio feature extraction model, so as to obtain target audio feature data respectively corresponding to the plurality of target audio frame data. The audio feature extraction model may be obtained by training a second predetermined deep learning model using a second training sample.

According to embodiments of the present disclosure, performing an audio feature extraction on the plurality of target video frame data of the target video to obtain at least one target audio feature data may include: performing a spectrum feature extraction on the plurality of target video frame data of the target video to obtain at least one target spectrum feature data, and obtaining the at least one target audio feature data according to the at least one target spectrum feature data. The target spectrum feature data may include Mel spectrum, Mel-Frequency Cepstral Coefficients (MFCC) and linear sound spectrum.

According to embodiments of the present disclosure, obtaining the at least one target audio feature data according to the at least one target spectrum feature data may include: determining the at least one target spectrum feature data as the at least one target audio feature data. Alternatively, a feature extraction may be performed on the at least one target spectrum feature data to obtain the at least one target audio feature data.

According to embodiments of the present disclosure, merging the at least one target image feature data and the at least one target audio feature data to obtain the at least one target feature data may include: determining target image feature data and target audio feature data corresponding to a same time point from the at least one target image feature data and the at least one target audio feature data. The target image feature data and the target audio feature data corresponding to the same time point may be concatenated to obtain the at least one target feature data. Alternatively, the target image feature data and the target audio feature data corresponding to the same time point may be added to obtain the at least one target feature data.

According to embodiments of the present disclosure, performing an image feature extraction on the plurality of target video frame data of the target video to obtain at least one target image feature data may include the following operations.

The plurality of target video frame data of the target video is processed by using an image feature extraction model, so as to obtain at least one target image feature data. The image feature extraction model is obtained by training a predetermined video understanding model.

According to embodiments of the present disclosure, the predetermined video understanding model may include at least one selected from: a 2D CNN (2D Convolutional Neural Networks) model, a C3D (Convolutional 3D) model, a two-stream sequence model, a fast sequence model, a temporal residual neural network model, a TSN (Temporal Segment Networks) model, or a TSM (Temporal Shift Module) model.

According to embodiments of the present disclosure, the image feature extraction model may be obtained by training a predetermined video understanding model using a first training sample. The first training sample may include a plurality of sample video frame data and a plurality of real video frame understanding results respectively corresponding to the plurality of sample video frame data. The image feature extraction model may be obtained by training a predetermined video understanding model using a first output value. The first output value is determined based on a first loss function according to the real video frame understanding results and predicted video frame understanding results respectively corresponding to the plurality of sample video frame data. The plurality of sample video frame data may be obtained by sparsely sampling at least one sample video. The image feature extraction model may be determined by adjusting a model parameter of the predetermined video understanding model according to the first output value until a first predetermined end condition is met. A feature extraction module of the predetermined video understanding model obtained when the first predetermined end condition is met may be determined as the image feature extraction model. For example, the predetermined video understanding model may have a structure of a classification structure of a TSM model. That is, an output of a spatial pooling layer of the TSM model may be used as a result of the image feature extraction. The first predetermined end condition may include a convergence of the first output value or reaching a first maximum number of training rounds.

According to embodiments of the present disclosure, performing an audio feature extraction on the plurality of target video frame data of the target video to obtain at least one target audio feature data may include the following operations.

According to embodiments of the present disclosure, the plurality of target video frame data may be processed by using an audio feature extraction model, so as to obtain at least one target audio feature data. The audio feature extraction model may be obtained by training a second predetermined deep learning model using a second training sample. The second predetermined deep learning model may include a convolutional neural network model. The convolutional neural network models may include a VGGish model or a VGGSound model. The VGGish model may be a VGG (Visual Geometry Group) model obtained by pre-training a convolutional neural network model using an AudioSet dataset. The VGGSound model may be a VGG model obtained by pre-training a convolutional neural network model using a VGGSound dataset.

According to embodiments of the present disclosure, operation S220 may include the following operations.

The at least one target feature data is processed by using a temporal action proposal model, so as to obtain at least one first candidate action proposal information.

According to embodiments of the present disclosure, the temporal action proposal model may be used to determine at least one first candidate action proposal information contained in the target resource. The temporal action proposal model may include a BSN (Boundary-Sensitive Network) model and a BMN (Boundary-Matching Network) model. The BSN model may include a temporal evaluation module (TEM), a proposal generation module (PGM), and a proposal evaluation module (PEM). The BMN model may include a base module (BM), a temporal evaluation module (TEM), and a proposal evaluation module.

According to embodiments of the present disclosure, the temporal action proposal model may be obtained by training a third predetermined deep learning model using a third training sample. The third training sample may include a plurality of first sample frame data and a plurality of first real sample action proposal intervals respectively corresponding to the plurality of first sample frame data. The third predetermined deep learning model may include a BMN model or a BSN model. A duration of the first sample frame data may be configured according to actual service requirements, which is not limited here. For example, the duration of the first sample frame data may be determined according to at least one selected from an input parameter requirement of the third predetermined deep learning model, a model structure of the third predetermined deep learning model, and a statistical value of a duration of an action segment contained in the event scene. For example, the event scene may be a football match. The duration of the first sample frame data may be set to 40 seconds.

According to embodiments of the present disclosure, the temporal action proposal model may be obtained by training a third predetermined deep learning model using a second output value. The second output value is determined based on a second loss function according to the first real sample action proposal intervals and first predicted sample action proposal intervals respectively corresponding to the plurality of first sample frame data. The temporal action proposal model may be determined by adjusting a model parameter of the third predetermined deep learning model according to the second output value until a second predetermined end condition is met. The third predetermined deep learning model obtained when the second predetermined end condition is met may be determined as the temporal action proposal model. The second predetermined end condition may include a convergence of the second output value or reaching a second maximum number of training rounds.

According to embodiments of the present disclosure, processing the at least one target feature data using the temporal action proposal model to obtain at least one first candidate action proposal information may include the following operations.

The plurality of target frame data are divided to obtain a plurality of target frame sequence data. Two adjacent target frame sequence data include the same target frame data. A temporal action proposal is performed on the target feature data corresponding to the plurality of target frame sequence data, so as to obtain at least one second candidate action proposal information corresponding to the plurality of target frame data. The at least one first candidate action proposal information may be obtained according to the at least one second candidate action proposal information corresponding to the plurality of target frame data.

According to embodiments of the present disclosure, a plurality of target frame data may be divided by using a sliding window, so as to obtain a plurality of target frame sequence data. Two adjacent sliding windows may have an overlapping region. The target frame sequence data may include a plurality of target frame data.

According to embodiments of the present disclosure, for each target frame sequence data in the plurality of target frame sequence data, a temporal action proposal may be performed on a plurality of target feature data corresponding to the target frame sequence data, so as to obtain at least one second candidate action proposal information. For example, the temporal action extraction may be performed on the plurality of target frame data corresponding to the target frame sequence data, so as to obtain the second candidate action proposal information respectively corresponding to the plurality of target frame data.

According to embodiments of the present disclosure, the second candidate action proposal information may include a third confidence level and a fourth confidence level. The third confidence level indicates a probability value that the target frame data is target frame data at an action start time point. The fourth confidence level indicates a probability value that the target frame data is target frame data at an action end time point.

According to embodiments of the present disclosure, obtaining at least one first candidate action proposal information according to the second candidate action proposal information corresponding to the plurality of target frame data may include the following operations.

At least one initial action start time point and at least one initial action end time point are determined from time points corresponding to the plurality of target frame data according to the at least one third confidence level and the at least one fourth confidence level corresponding to the plurality of target frame data. A duration matching is performed on the at least one initial action start time point and at least one initial action end time point to obtain at least one matching time point pair. The at least one first candidate action proposal information is obtained according to the at least one matching time point pair.

According to embodiments of the present disclosure, the second candidate action proposal information may further include a classification result indicating whether the target frame data contains an action.

According to embodiments of the present disclosure, for each target frame sequence data in a plurality of target frame sequence data, for each target frame data in a plurality of target frame data included in the target frame sequence data, a fifth confidence level corresponding to the target frame data may be determined according to the at least one third confidence level corresponding to the target frame data, a sixth confidence level corresponding to the target frame data may be determined according to the at least one fourth confidence level corresponding to the target frame data, and a seventh confidence level corresponding to the target frame data may be determined according to the fifth confidence level and the sixth confidence level corresponding to the target frame data.

According to embodiments of the present disclosure, determining the fifth confidence level corresponding to the target frame data according to the at least one third confidence level corresponding to the target frame data may include: determining a first average confidence level corresponding to the target frame data according to the at least one third confidence level corresponding to the target frame data; and determining the first average confidence level corresponding to the target frame data as the fifth confidence level corresponding to the target frame data. Alternatively, it is possible to determine a maximum third confidence level from the at least one third confidence level corresponding to the target frame data, and the maximum third confidence level may be determined as the fifth confidence level corresponding to the target frame data.

According to embodiments of the present disclosure, determining the sixth confidence level corresponding to the target frame data according to the at least one fourth confidence level corresponding to the target frame data may include: determining a second average confidence level corresponding to the target frame data according to the at least one fourth confidence level corresponding to the target frame data; and determining the second average confidence level corresponding to the target frame data as the sixth confidence level corresponding to the target frame data. Alternatively, it is possible to determine a maximum fourth confidence level from the at least one fourth confidence level corresponding to the target frame data, and the maximum fourth confidence level may be determined as the sixth confidence level corresponding to the target frame data.

According to embodiments of the present disclosure, determining the seventh confidence level corresponding to the target frame data according to the sixth confidence level and the seventh confidence level corresponding to the target frame data may include: determining a maximum confidence level from the fifth confidence level and the sixth confidence level corresponding to the target frame data, and determining the maximum confidence level corresponding to the target frame data as the seventh confidence level corresponding to the target frame data.

According to embodiments of the present disclosure, when it is determined that the seventh confidence level is greater than or equal to a first predetermined confidence level, if it is determined that the time point corresponding to the seventh confidence level is the action start time point, the time point corresponding to the seventh confidence level may be determined as the initial action start time point; if it is determined that the time point corresponding to the seventh confidence level is the action end time point, the time point corresponding to the seventh confidence level may be determined as the initial action end time point. The first predetermined confidence level may be configured according to actual service requirements, which is not limited here.

According to embodiments of the present disclosure, after the at least one initial action start time point and the at least one initial action end time point are determined, for each initial action start time point in the at least one initial action start time point, it may be determined whether the at least one initial action end time point includes an initial action end time point that is after the initial action start time point and that differs from the initial action start time point by a predetermined time interval. When it is determined that the at least one initial action end time point includes a target initial action end time point that is after the initial action start time point and that differs from the initial action start time point by the predetermined time interval, the target initial action end time point and the initial action start time point may be determined as a matching time point pair. The initial action start time point in the matching time point pair is determined as a first candidate action start time point. At least one matching time point pair may thus be obtained. At least one target matching time point pair may be determined from the at least one matching time point pair. The initial action start time point in the target matching time point pair is determined as a first candidate action start time point. The target initial action end time point in the target matching time point pair is determined as a first candidate action end time point.

According to embodiments of the present disclosure, obtaining at least one first candidate action proposal information according to the at least one matching time point pair may include the following operations.

At least one first candidate action proposal information is obtained by using a second non-maximum suppression method according to the at least one matching time point pair.

According to embodiments of the present disclosure, the at least one target matching time point pair may be determined from the at least one matching time point pair by using the second non-maximum suppression method. The target matching time point pair is determined as the first candidate action proposal information. The non-maximum suppression (NMS) method may include a Soft-NMS method.

According to embodiments of the present disclosure, operation S230 may include the following operations.

Target feature data corresponding to the at least one first candidate action proposal interval is processed by using an action classification model, so as to obtain at least one classification confidence level corresponding to the at least one first candidate action proposal interval.

According to embodiments of the present disclosure, the action classification model may be obtained by training a predetermined temporal action classification model using an output value. The output value is determined based on a loss function according to a real action category, a predicted action category and an integrity evaluation value corresponding to a plurality of sample action segments. The integrity evaluation value is used to evaluate an integrity of the sample action segment.

According to embodiments of the present disclosure, the predetermined temporal action classification model may be configured according to actual service requirements, which is not limited herein. For example, the predetermined temporal action classification model may include a model based on attention mechanism and long short-term memory network.

According to embodiments of the present disclosure, the integrity evaluation value corresponding to the sample action segment may be determined according to a second real sample action proposal interval (i.e., the real sample action period) and a second predicted sample action proposal interval (i.e., the predicted sample action period) corresponding to the sample action segment. For example, an intersection over union (IoU) of the second real sample action proposal interval and the second predicted sample action proposal interval corresponding to the sample action segment may be determined as the integrity evaluation value corresponding to the sample action segment. The second predicted sample action proposal interval corresponding to the sample action segment may be obtained according to a temporal action proposal performed on the sample feature data corresponding to the second sample frame data.

According to embodiments of the present disclosure, the action classification model may be determined by adjusting a model parameter of a predetermined temporal action classification model according to a third output value (i.e., the output value) until a third predetermined end condition is met. The predetermined temporal action classification model obtained when the third predetermined end condition is met may be determined as the action classification model. The third predetermined end condition may include a convergence of the third output value or reaching a third maximum number of training rounds.

According to embodiments of the present disclosure, by using the integrity evaluation value in the training of the action classification model, a training speed and a prediction accuracy of the model may be improved.

According to embodiments of the present disclosure, operation S240 may include the following operations.

A target classification confidence level corresponding to the at least one first candidate action interval is determined according to the at least one classification confidence level corresponding to the at least one first candidate action proposal interval. At least one second candidate action proposal interval is determined from the at least one first candidate action proposal interval according to the target classification confidence level corresponding to the at least one first candidate action proposal interval. At least one third candidate action proposal interval may be obtained by using a first non-maximum suppression method according to the at least one second candidate action proposal interval. An action detection result for at least one action segment contained in the target resource may be determined according to the at least one third candidate action proposal interval and the action category indicated by the target classification confidence level corresponding to the at least one third candidate action extraction interval.

According to embodiments of the present disclosure, for each first candidate action proposal interval in the at least one first candidate action proposal interval, a maximum classification confidence level may be determined from the at least one classification confidence level corresponding to the candidate action proposal interval, and the maximum classification confidence level corresponding to the candidate action proposal interval may be determined as the target classification confidence level.

According to embodiments of the present disclosure, at least one third candidate action proposal interval may be determined from the at least one second candidate action proposal interval by using the first non-maximum suppression method. For each third candidate action proposal interval in the at least one third candidate action proposal interval, the action category indicated by the target classification confidence level corresponding to the third candidate action proposal interval is determined as the action category corresponding to the third candidate action proposal interval. The candidate action start time point included in the third candidate action proposal interval is determined as the action start time point of the action segment. The candidate action end time point included in the third candidate action proposal interval is determined as the action end time point of the action segment. The action category corresponding to the third candidate action proposal interval is determined as the action category of the action segment.

According to embodiments of the present disclosure, determining at least one second candidate action proposal interval from the at least one first candidate action proposal interval according to the target classification confidence level corresponding to the at least one first candidate action proposal interval may include the following operations.

For each first candidate action proposal interval in the at least one first candidate action proposal interval, the first candidate action proposal interval is determine as the second candidate action proposal interval when it is determined that the target classification confidence level corresponding to the first candidate action proposal interval is greater than or equal to a predetermined classification confidence level.

According to embodiments of the present disclosure, the predetermined classification confidence level may be configured according to actual service requirements, which is not limited here.

According to embodiments of the present disclosure, determining at least one second candidate action proposal interval from the at least one first candidate action proposal interval according to the target classification confidence level corresponding to the at least one first candidate action proposal interval may include the following operations.

The target classification confidence level corresponding to the at least one first candidate action proposal interval is ranked to obtain a ranking result. The at least one second candidate action proposal interval is determined from the at least one first candidate action proposal interval according to the ranking result.

According to embodiments of the present disclosure, the target classification confidence level respectively corresponding to the at least one first candidate action proposal interval may be ranked to obtain a first ranking result (that is, the ranking result). A predetermined number of first candidate action proposal interval may be determined from the at least one first candidate action proposal interval according to the first ranking result, so as to obtain the at least one second candidate action proposal interval. The ranking may include ranking the at least one first candidate action proposal interval in a descending order of the target classification confidence level, or ranking the at least one first candidate action proposal interval in an ascending order of the target classification confidence level. For example, in a case of ranking in an ascending order of the target classification confidence level, the at least one second candidate action proposal interval may be determined from a predetermined number of lower-ranked first candidate action proposal interval.

According to embodiments of the present disclosure, the first candidate action proposal interval may include a first candidate action start time point and a first candidate action end time point.

According to embodiments of the present disclosure, the first candidate action proposal information may further include a first confidence level corresponding to the first candidate action start time point and a second confidence level corresponding to the first candidate action end time point.

According to embodiments of the present disclosure, operation S240 may include the following operations.

At least one confidence level corresponding to the at least one first candidate action proposal interval is obtained according to the at least one classification confidence level and an integrity confidence level corresponding to the at least one first candidate action proposal interval. The integrity confidence level is determined according to the first confidence level and the second confidence level corresponding to the first candidate action proposal interval. The action detection result for the at least one action segment contained in the target resource is determined according to the at least one confidence level corresponding to the at least one first candidate action proposal interval.

According to embodiments of the present disclosure, the integrity confidence level may indicate the integrity of the action proposal interval. The integrity of the action proposal interval may be used to indicate an integrity of the action segment. The integrity confidence level corresponding to the first candidate action proposal interval may be determined according to the first confidence level and the second confidence level corresponding to the first candidate action proposal interval. For example, the integrity confidence level corresponding to the first candidate action proposal interval may be determined according to a third average confidence level corresponding to the first candidate action proposal interval. The third average confidence level may be an average value of the first confidence level and the second confidence level.

According to embodiments of the present disclosure, for each first candidate action proposal interval in the at least one first candidate action proposal interval, a maximum classification confidence level may be determined from the at least one classification confidence level corresponding to the first candidate action proposal interval. The maximum classification confidence level corresponding to the first candidate action proposal interval is determined as the target classification confidence level corresponding to the first candidate action proposal interval. A weighted average confidence level corresponding to the first candidate action proposal interval may be determined according to the target classification confidence level and the integrity confidence level corresponding to the first candidate action proposal interval. The weighted average confidence level corresponding to the first candidate action proposal interval may be determined as the confidence level corresponding to the candidate action proposal interval.

According to embodiments of the present disclosure, determining the action detection result for the at least one action segment contained in the target resource according to the at least one confidence level corresponding to the at least one first candidate action proposal interval may include: determining at least one fourth candidate action proposal interval from the at least one first candidate action proposal interval according to the at least one confidence level corresponding to the at least one first candidate action proposal interval; obtaining at least one fifth candidate action proposal interval according to the at least one fourth candidate action proposal interval by using a third non-maximum suppression method; and determining the action detection result for the at least one action segment contained in the target resource according to the at least one fifth candidate action proposal interval and the action category indicated by the target classification confidence level corresponding to the at least one fifth candidate action proposal interval.

According to embodiments of the present disclosure, determining at least one fourth candidate action proposal interval from the at least one first candidate action proposal interval according to the at least one confidence level corresponding to the at least one first candidate action proposal interval may include: for each first candidate action proposal interval in the at least one first candidate action proposal interval, determining the first candidate action proposal interval as the fourth candidate action proposal interval when it is determined that the confidence level corresponding to the first candidate action proposal interval is greater than or equal to a second predetermined confidence level. The second predetermined confidence level may be configured according to actual service requirements, which is not limited here.

According to embodiments of the present disclosure, determining at least one fourth candidate action proposal interval from the at least one first candidate action proposal interval according to the at least one confidence level corresponding to the at least one first candidate action proposal interval may include: ranking the at least one confidence level corresponding to the at least one first candidate action proposal interval to obtain a second ranking result; and determining the at least one fourth candidate action proposal interval from the at least one first candidate action proposal interval according to the second ranking result.

The method of detecting the action according to the present disclosure will be further described with reference to FIG. 3A, FIG. 3B, FIG. 3C and FIG. 3D in conjunction with specific embodiments.

Figure 3A:
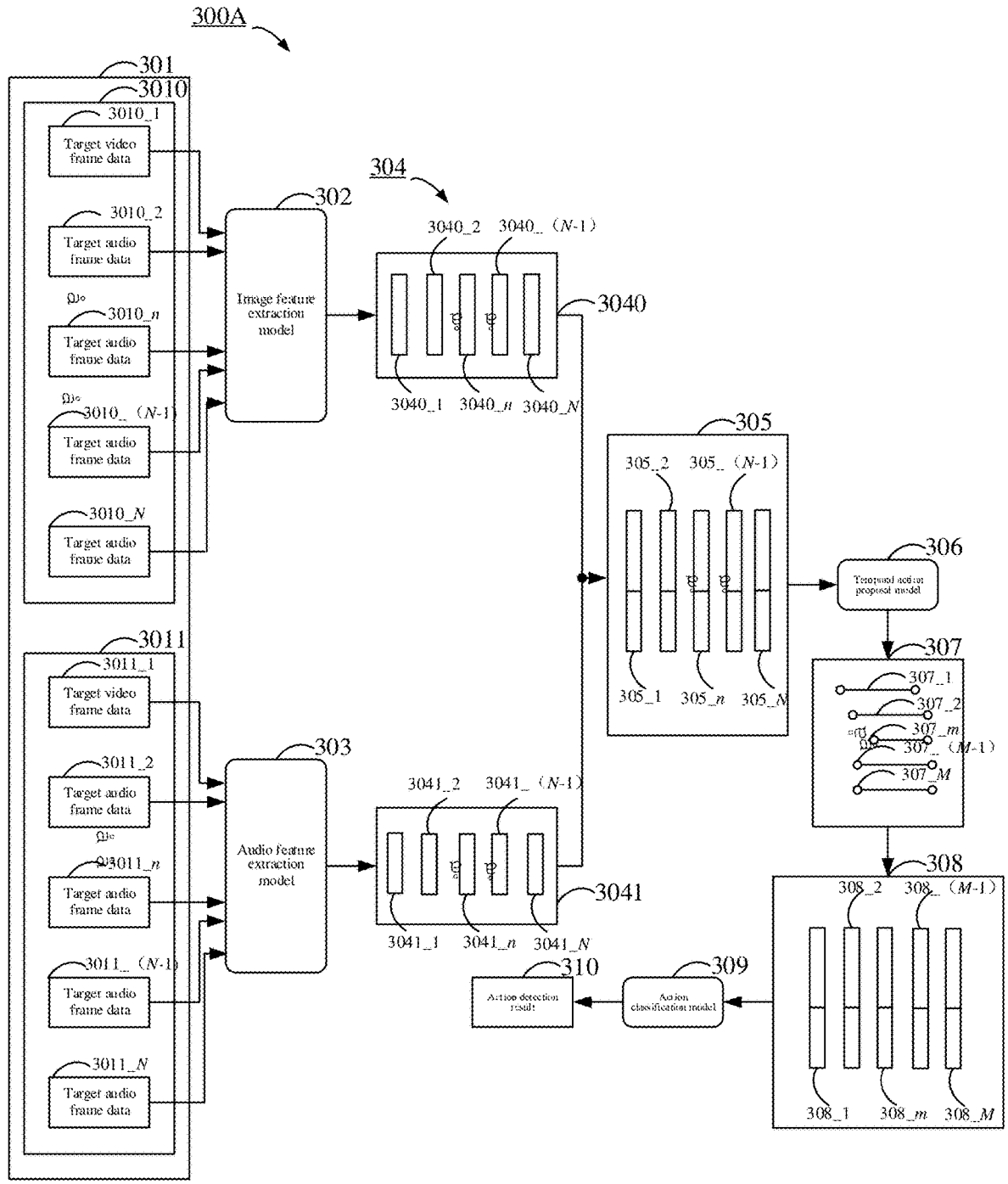
FIG. 3A schematically shows an example schematic diagram of a method of detecting an action according to embodiments of the present disclosure.

FIG. 3A schematically shows an example schematic diagram of a method of detecting an action according to embodiments of the present disclosure.

As shown in FIG. 3A, in 300A, target video data 301 of a target video may include a set of target video frame data 3010 and a set of target audio frame data 3011. The set of target video frame data 3010 may include target video frame data 3010_1, target video frame data 3010_2, ..., target video frame data 3010_$n$, ..., target video frame data 3010_(N-1), and target video frame data 3010_N. The set of target audio frame data 3011 may include target audio frame data 3011_1, target audio frame data 3011_2, ..., target audio frame data 3011_$n$, ..., target audio frame data 3011_(N-1), and target audio frame data 3011_N. The target video frame data 3010_$n$ corresponds to the target audio frame data 3011_$n$. N may be an integer greater than 1. $n \in \{1, 2, \ldots, (N-1), N\}$.

The set of target video frame data 3010 may be processed by using an image feature extraction model 302, so as to obtain a set of target image feature data 3040. The set of target image feature data 3040 may include target image feature data 3040_1, target image feature data 3040_2, ..., target image feature data 3040_$n$, ..., target image feature data 3040_(N-1), and target image feature data 3040_N. The set of target audio frame data 3011 may be processed by using an audio feature extraction model 303, so as to obtain a set of target audio feature data 3041. The set of target audio feature data 3041 may include target audio feature data 3041_1, target audio feature data 3041_2, ..., target audio feature data 3041_$n$, ..., target audio feature data 3041_(N-1), and target audio feature data 3041_N.

The set of target image feature data 3040 and the set of target audio feature data 3041 may be merged to obtain a set of target feature data 305. The set of target feature data 305 may include target feature data 305_1, target feature data 305_2, ..., target feature data 305_$n$, ..., target feature data 305_(N-1), and target feature data 305_N. The target feature data 305_$n$ is obtained by concatenating the target image feature data 3040_$n$ and the target audio feature data 3041_$n$.

The set of target feature data 305 may be processed by using a temporal action proposal model 306, so as to obtain a set of first candidate action proposal information 307. The set of first candidate action proposal information 307 may include a first candidate action proposal interval 307_1, a first candidate action proposal interval 307_2, ..., a first candidate action proposal interval 307_$m$, ..., a first candidate action proposal interval 307_(M-1), and a first candidate action proposal interval 307_M. M may be an integer greater than 1 and less than or equal to M. $m \in \{1, 2, \ldots, m, (M-1), M\}$.

A set of target feature data 308 corresponding to the set of first candidate action proposal information 307 may be processed by using an action classification model 309, so as to obtain at least one classification confidence level corresponding to the set of first candidate action proposal interval 307_$m$. The set of target feature data 308 may include target feature data 3081, target feature data 308_2, ..., target feature data 308_$m$, target feature data 308_(M-1), and target feature data 308_M. The target feature data 308_$m$ is the target feature data corresponding to the first candidate action proposal interval 307_$m$.

An action detection result 310 for at least one action segment contained in the target resource may be determined according to at least one classification confidence level corresponding to the first candidate action proposal interval 307_1, at least one classification confidence level corresponding to the first candidate action proposal interval 307_2, ..., at least one classification confidence level corresponding to the first candidate action proposal interval 307_$m$, ..., at least one classification confidence level corresponding to the first candidate action proposal interval 307_(M-1), and at least one classification confidence level corresponding to the first candidate action proposal interval 307_M.

Applications of the method of detecting the action in FIG. 3A to different scenes will be described with reference to FIG. 3B, FIG. 3C and FIG. 3D in conjunction with specific embodiments.

Figure 3B:
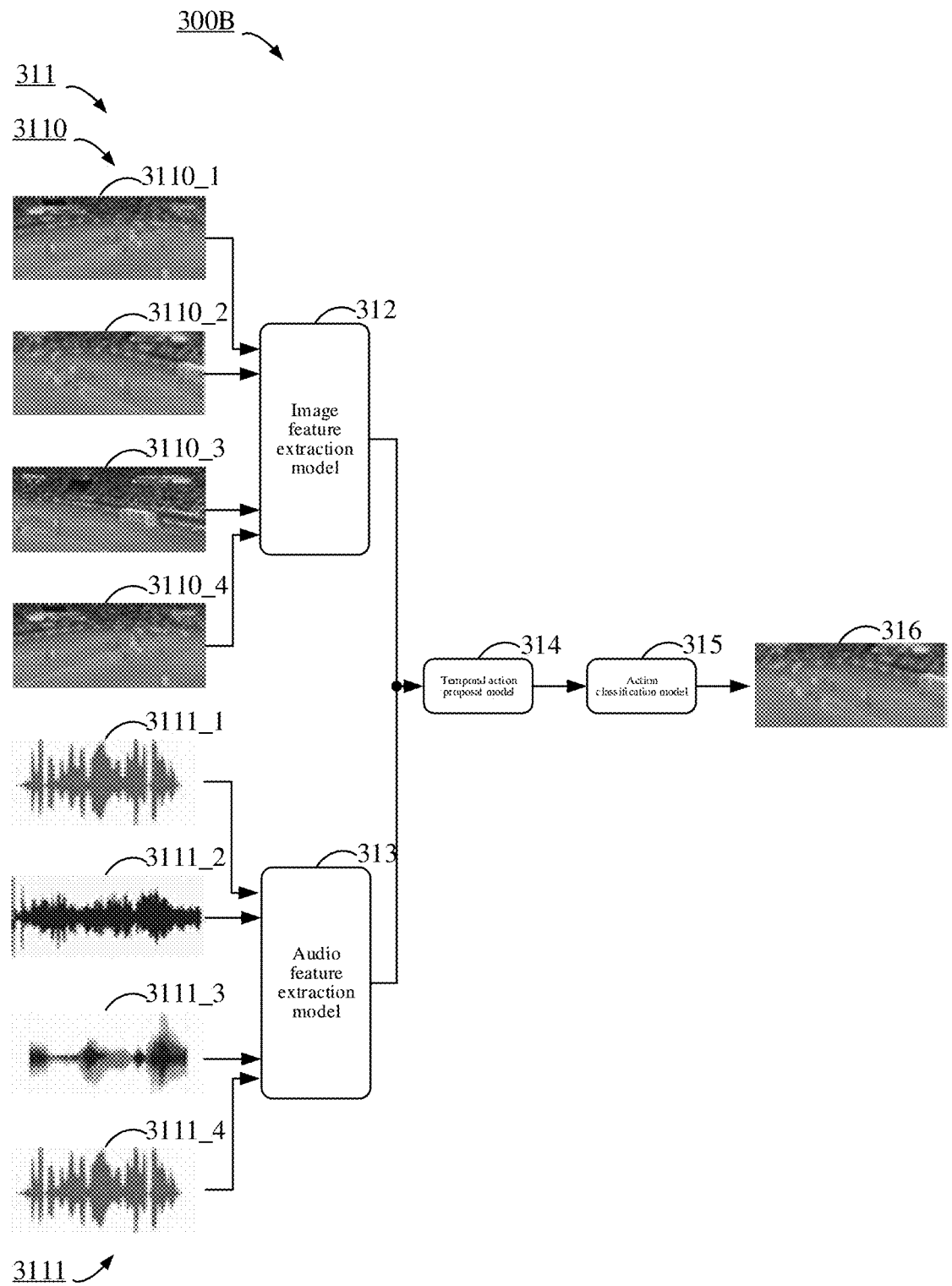
FIG. 3B schematically shows an example schematic diagram of a method of detecting an action in a scene of a football match highlight event according to embodiments of the present disclosure.

FIG. 3B schematically shows an example schematic diagram of a method of detecting an action in a scene of a football match highlight event according to embodiments of the present disclosure.

As shown in FIG. 3B, in 300B, target video data 311 of a target video is video data in a football match "??????" The target video data 311 may include a set of target video frame data 3110 and a set of target audio frame data 3111.

The set of target video frame data 3110 may include target video frame data 3110_1, target video frame data 3110_2, target video frame data 3110_3, and target video frame data 3110_4. The target video frame data 3110_2 is video frame data containing a "penalty action".

The set of target audio frame data 3111 may include target audio frame data 3111_1, target audio frame data 3111_2, target audio frame data 3111_3, and target audio frame data 3111_4.

The set of target video frame data 3110 may be processed by using an image feature extraction model 312, so as to obtain a set of target image feature data. The set of target audio frame data 3111 may be processed by using an audio feature extraction model 313, so as to obtain a set of target audio feature data.

The set of target image feature data and the set of target audio feature data may be merged to obtain a set of target feature data.

The set of target feature data passes through a temporal action proposal model 314 and an action classification model 315 in sequence to obtain an action detection result 316. For the processing of the temporal action proposal model 314 and the action classification model 315, reference may be made to the descriptions of relevant parts above, and details will not be repeated here. The action detection result 316 indicates that a highlight event detected in the football match is the "penalty action" in the target video frame data 3110_2.

Figure 3C:
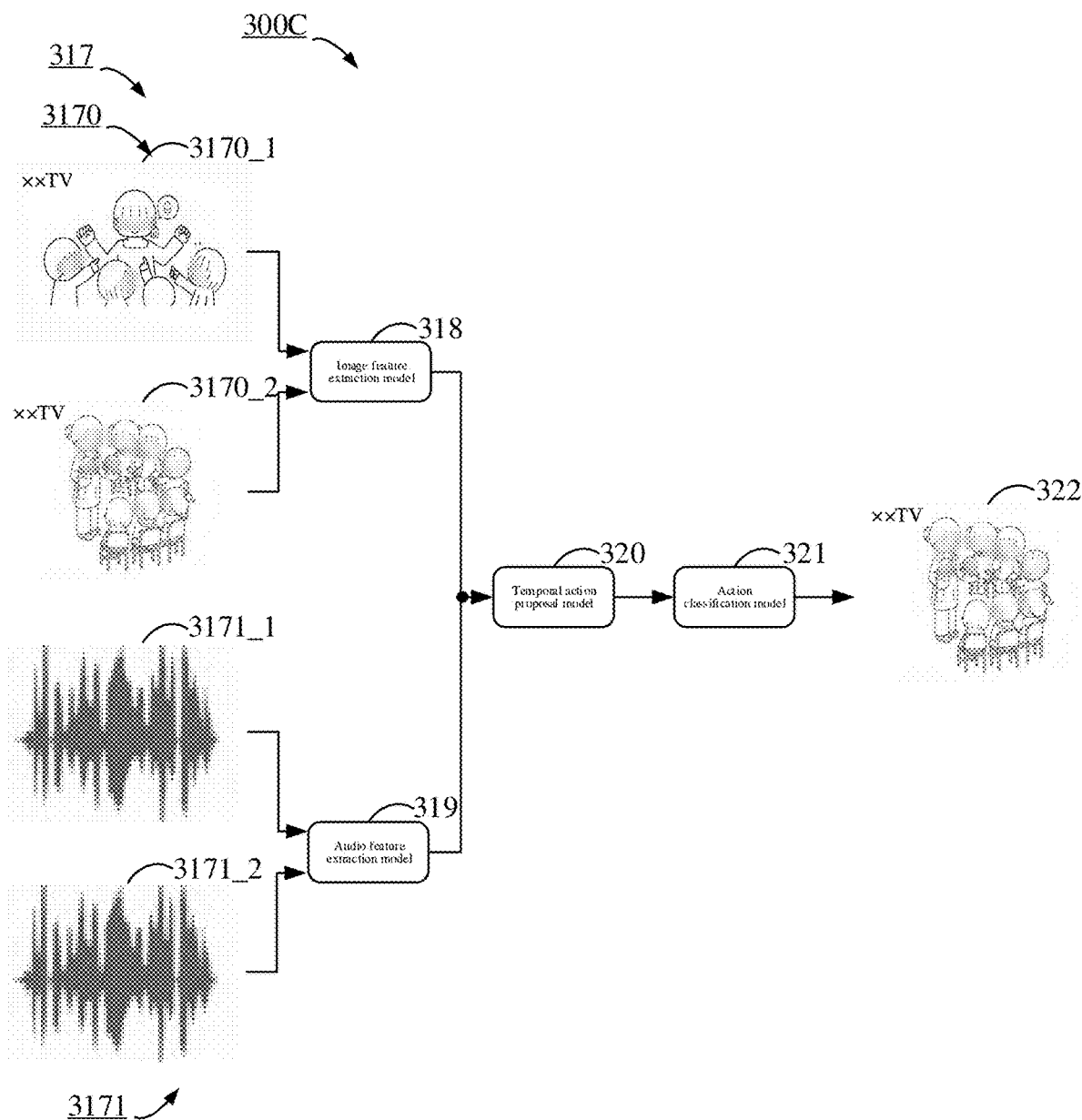
FIG. 3C schematically shows an example schematic diagram of a method of detecting an action in a scene of a movie and television highlight event according to embodiments of the present disclosure.

FIG. 3C schematically shows an example schematic diagram of a method of detecting an action in a scene of a film and television highlight event according to embodiments of the present disclosure.

As shown in FIG. 3C, in 300C, target video data 317 of a target video is video data in a TV play "XXX". The target video data 317 may include a set of target video frame data 3170 and a set of target audio frame data 3171.

The set of target video frame data 3170 may include target video frame data 3170_1 and target video frame data 3170_2. The target video frame data 3170_2 is video frame data containing a "prize distribution action".

The set of target audio frame data 3171 may include target audio frame data 3171_1 and target audio frame data 3117_2.

The set of target video frame data 3170 may be processed by using an image feature extraction model 318, so as to obtain a set of target image feature data. The set of target audio frame data 3171 may be processed by using an audio feature extraction model 319, so as to obtain a set of target audio feature data.

The set of target image feature data and the set of target audio feature data may be merged to obtain a set of target feature data.

The set of target feature data passes through a temporal action proposal model 320 and an action classification model 321 in sequence to obtain an action detection result 322. For the processing of the temporal action proposal model 320 and the action classification model 321, reference may be made to the descriptions of relevant parts above, and details will not be repeated here. The action detection result 322 indicates that a highlight event detected in the TV play is the "prize distribution action" in the target video frame data 3170_2.

Figure 3D:
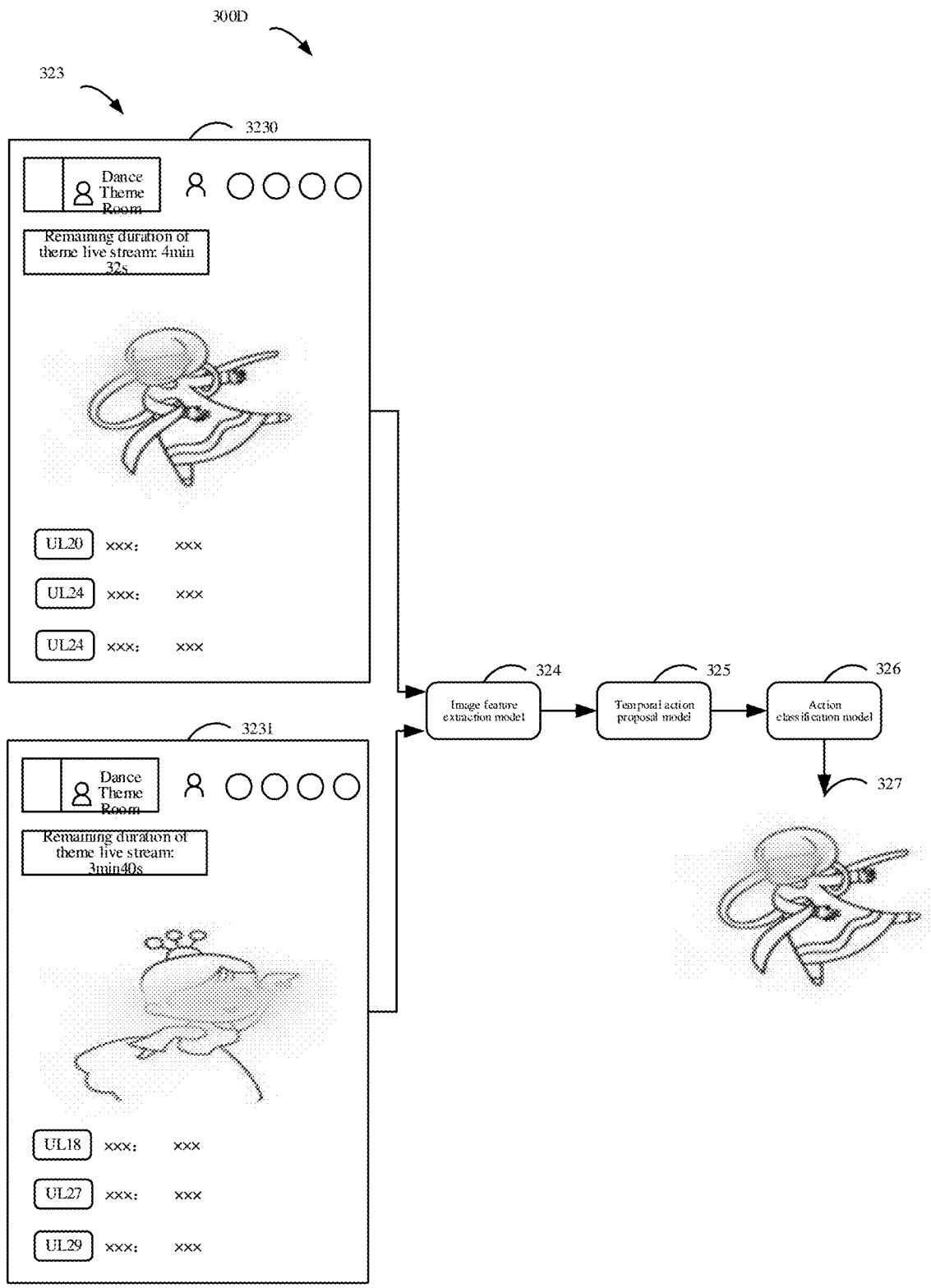
FIG. 3D schematically shows an example schematic diagram of a method of detecting an action in a scene of a live-stream highlight event according to embodiments of the present disclosure.

FIG. 3D schematically shows an example schematic diagram of a method of detecting an action in a scene of a live-stream highlight event according to embodiments of the present disclosure.

As shown in FIG. 3D, in 300D, target video data 323 of a target video is video data in a theme live stream room "Dance Theme Room". The target video data 323 may include target video frame data 3230 and target video frame data 3231. The target video frame data 3230 is video frame data containing a "single-leg rotation action".

The target video data 323 may be processed by using an image feature extraction model 324, so as to obtain a set of target image feature data.

The set of target feature data passes through a temporal action proposal model 325 and an action classification model 326 in sequence to obtain an action detection result 327. For the processing of the temporal action proposal model 320 and the action classification model 321, reference may be made to the descriptions of relevant parts above, and details will not be repeated here. The action detection result 327 indicates that a highlight event detected in the theme live stream room is the "single-leg rotation action" in the target video frame data 3230.

In the technical solution of the present disclosure, an acquisition, a storage, a use, a processing, a transmission, a provision and a disclosure of user personal information involved comply with provisions of relevant laws and regulations, and do not violate public order and good custom.

The above are merely exemplary embodiments. The present disclosure is not limited thereto, and may further include other methods of detecting an action known in the art, as long as an action detection for a target source having an arbitrary duration may be performed.

Figure 4:
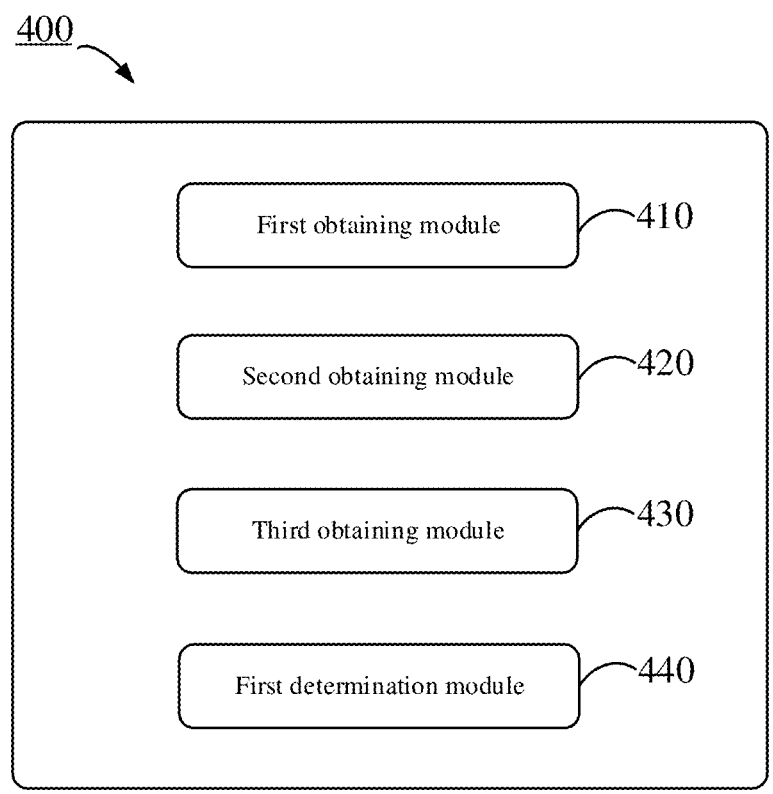
FIG. 4 schematically shows a block diagram of an apparatus of detecting an action according to embodiments of the present disclosure.

FIG. 4 schematically shows a block diagram of an apparatus of detecting an action according to embodiments of the present disclosure.

As shown in FIG. 4, an apparatus 400 of detecting an action may include a first obtaining module 410, a second obtaining module 420, a third obtaining module 430, and a first determination module 440.

The first obtaining module 410 to perform a feature extraction on a plurality of target frame data of a target resource, so as to obtain at least one target feature data.

The second obtaining module 420 may be used to perform a temporal action proposal on the at least one target feature data, so as to obtain at least one first candidate action proposal information. The first candidate action proposal information includes a first candidate action proposal interval.

The third obtaining module 430 may be used to classify target feature data corresponding to the at least one first candidate action proposal interval, so as to obtain at least one classification confidence level corresponding to the at least one first candidate action proposal interval.

The first determination module 440 may be used to determine an action detection result for at least one action segment contained in the target resource according to the at least one classification confidence level corresponding to the at least one first candidate action proposal interval. The action detection result includes an action category and an action period.

According to embodiments of the present disclosure, the first determination module may include a first determination sub-module, a second determination sub-module, a first obtaining sub-module, and a third determination sub-module.

The first determination sub-module may be used to determine a target classification confidence level corresponding to the at least one first candidate action interval according to the at least one classification confidence level corresponding to the at least one first candidate action proposal interval.

The second determination sub-module may be used to determine, from the at least one first candidate action proposal interval, at least one second candidate action proposal interval according to the target classification confidence level corresponding to the at least one first candidate action proposal interval.

The first obtaining sub-module may be used to obtain, by using a first non-maximum suppression method, at least one third candidate action proposal interval according to the at least one second candidate action proposal interval.

The third determination sub-module may be used to determine the action detection result for the at least one action segment contained in the target resource according to the at least one third candidate action proposal interval and the action category indicated by the target classification confidence level corresponding to the at least one third candidate action proposal interval.

According to embodiments of the present disclosure, the second determination sub-module may include a first determination unit.

The first determination unit may be used to determine, for each first candidate action proposal interval in the at least one of first candidate action proposal interval, the first candidate action proposal interval as the second candidate action proposal interval in response to a determination that the target classification confidence level corresponding to the first candidate action proposal interval is greater than or equal to a predetermined classification confidence level.

According to embodiments of the present disclosure, the second determination sub-module may include a ranking unit and a second determination unit.

The ranking unit may be used to rank the target classification confidence level corresponding to the at least one first candidate action proposal interval, so as to obtain a ranking result.

The second determination unit may be used to determine the at least one second candidate action proposal interval from the at least one first candidate action proposal interval according to the ranking result.

According to embodiments of the present disclosure, the first candidate action proposal interval includes a first candidate action start time point and a first candidate action end time point.

According to embodiments of the present disclosure, the first candidate action proposal information further includes a first confidence level corresponding to the first candidate action start time point and a second confidence level corresponding to the first candidate action end time point.

According to embodiments of the present disclosure, the first determination module 440 may include a second obtaining sub-module and a fourth determination sub-module.

The second obtaining sub-module may be used to obtain at least one confidence level corresponding to the at least one first candidate action proposal interval according to the at least one classification confidence level corresponding to the at least one first candidate action proposal interval and an integrity confidence level corresponding to the at least one first candidate action proposal interval. The integrity confidence level is determined according to the first confidence level and the second confidence level corresponding to the first candidate action proposal interval.

The fourth determination sub-module may be used to determine the action detection result for the at least one action segment contained in the target resource according to the at least one confidence level corresponding to the at least one first candidate action proposal interval.

According to embodiments of the present disclosure, the third obtaining module 430 may include a third obtaining sub-module.

The third obtaining sub-module may be used to process, by using an action classification model, the target feature data corresponding to the at least one first candidate action proposal interval, so as to obtain the at least one classification confidence level corresponding to the at least one first candidate action proposal interval.

According to embodiments of the present disclosure, the action classification model is obtained by training a predetermined temporal action classification model using an output value. The output value is determined based on a loss function according to a real action category, a predicted action category and an integrity evaluation value corresponding to a plurality of sample action segments. The integrity evaluation value is for evaluating an integrity of the sample action segment.

According to embodiments of the present disclosure, the target resource includes a target video.

According to embodiments of the present disclosure, the first obtaining module 410 may include a fourth obtaining sub-module, a fifth obtaining sub-module, and a sixth obtaining sub-module.

The fourth obtaining sub-module may be used to perform an image feature extraction on a plurality of target video frame data of the target video, so as to obtain at least one target image feature data.

The fifth obtaining sub-module may be used to perform an audio feature extraction on the plurality of target video frame data of the target video, so as to obtain at least one target audio feature data.

The sixth obtaining sub-module may be used to merge the at least one target image feature data and the at least one target audio feature data to obtain the at least one target feature data.

According to embodiments of the present disclosure, the fourth obtaining sub-module may include a first obtaining unit.

The first obtaining unit may be used to process the plurality of target video frame data of the target video by using an image feature extraction model, so as to obtain the at least one target image feature data. The image feature extraction model is obtained by training a predetermined video understanding model.

According to embodiments of the present disclosure, the second obtaining module 420 may include a seventh obtaining sub-module.

The seventh obtaining sub-module may be used to process the at least one target feature data by using a temporal action proposal model, so as to obtain the at least one first candidate action proposal information.

According to embodiments of the present disclosure, the seventh obtaining sub-module may include a second obtaining unit, a third obtaining unit, and a fourth obtaining unit.

The second obtaining unit may be used to divide the plurality of target frame data to obtain a plurality of target frame sequence data. Two adjacent target frame sequence data include a same target frame data.

The third obtaining unit may be used to perform a temporal action proposal on the target feature data corresponding to the plurality of target frame sequence data, so as to obtain at least one second candidate action proposal information corresponding to the plurality of target frame data.

The fourth obtaining unit may be used to obtain the at least one first candidate action proposal information according to the at least one second candidate action proposal information corresponding to the plurality of target frame data.

According to embodiments of the present disclosure, the second candidate action proposal information includes a third confidence level and a fourth confidence level. The third confidence level indicates a probability value that the target frame data is target frame data at an action start time point. The fourth confidence level indicates a probability value that the target frame data is target frame data at an action end time point.

According to embodiments of the present disclosure, the fourth obtaining unit may include a determination sub-unit, a first obtaining sub-unit, and a second obtaining sub-unit.

The determination sub-unit may be used to determine, from a plurality of time points corresponding to the plurality of target frame data, at least one initial action start time point and at least one initial action end time point according to the at least one third confidence level and the at least one fourth confidence level corresponding to the plurality of target frame data.

The first obtaining sub-unit may be used to perform a duration matching on the at least one initial action start time point and the at least one initial action end time point, so as to obtain at least one matching time point pair.

The second obtaining sub-unit may be used to obtain the at least one first candidate action proposal information according to the at least one matching time point pair.

According to embodiments of the present disclosure, the second obtaining sub-unit may be used to: obtain, by using a second non-maximum suppression method, the at least one first candidate action proposal information according to the at least one matching time point pair.

According to embodiments of the present disclosure, the present disclosure further provides an electronic device, a readable storage medium, and a computer program product.

According to embodiments of the present disclosure, the present disclosure further provides an electronic device, including: at least one processor; and a memory communicatively connected to the at least one processor, the memory stores instructions executable by the at least one processor, and the instructions, when executed by the at least one processor, cause the at least one processor to implement the method described above.

According to embodiments of the present disclosure, the present disclosure further provides a non-transitory computer-readable storage medium having computer instructions therein, and the computer instructions are used to cause a computer to implement the method described above.

According to embodiments of the present disclosure, the present disclosure further provides a computer program product containing a computer program, and the computer program, when executed by a processor, causes the processor to implement the method described above.

Figure 5:
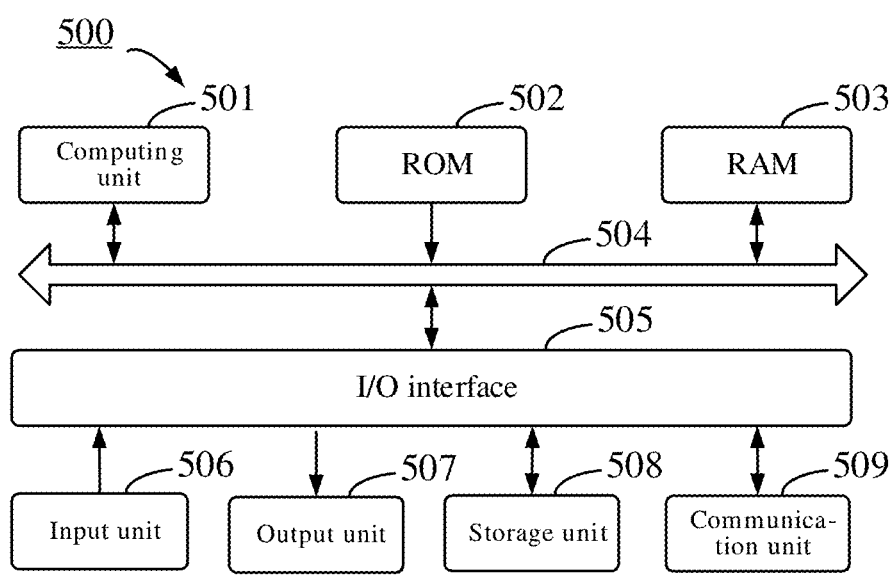
FIG. 5 schematically shows a block diagram of an electronic device suitable for implementing a method of detecting an action according to embodiments of the present disclosure.

FIG. 5 schematically shows a block diagram of an electronic device suitable for implementing a method of detecting an action according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 5, an electronic device 500 includes a computing unit 501 which may perform various appropriate actions and processes according to a computer program stored in a read only memory (ROM) 502 or a computer program loaded from a storage unit 508 into a random access memory (RAM) 503. In the RAM 503, various programs and data necessary for an operation of the electronic device 500 may also be stored. The computing unit 501, the ROM 502 and the RAM 503 are connected to each other through a bus 504. An input/output (I/O) interface 505 is also connected to the bus 504.

A plurality of components in the electronic device 500 are connected to the I/O interface 505, including: an input unit 506, such as a keyboard, or a mouse; an output unit 507, such as displays or speakers of various types; a storage unit 508, such as a disk, or an optical disc; and a communication unit 509, such as a network card, a modem, or a wireless communication transceiver. The communication unit 509 allows the electronic device 500 to exchange information/data with other devices through a computer network such as Internet and/or various telecommunication networks.

The computing unit 501 may be various general-purpose and/or dedicated processing assemblies having processing and computing capabilities. Some examples of the computing units 501 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 501 executes various methods and steps described above, such as the method of detecting the action. For example, in some embodiments, the method of detecting the action may be implemented as a computer software program which is tangibly embodied in a machine-readable medium, such as the storage unit 508. In some embodiments, the computer program may be partially or entirely loaded and/or installed in the electronic device 500 via the ROM 502 and/or the communication unit 509. The computer program, when loaded in the RAM 503 and executed by the computing unit 501, may execute one or more steps in the method of detecting the action described above. Alternatively, in other embodiments, the computing unit 501 may be used to perform the method of detecting the action by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of detecting an action, the method comprising:

performing a feature extraction on a plurality of target frame data of a target resource, so as to obtain at least one target feature data;

performing a temporal action proposal on the at least one target feature data, so as to obtain at least one first candidate action proposal information, wherein the first candidate action proposal information comprises a first candidate action proposal interval;

classifying target feature data corresponding to the at least one first candidate action proposal interval, so as to obtain at least one classification confidence level corresponding to the at least one first candidate action proposal interval; and determining an action detection result for at least one action segment contained in the target resource according to the at least one classification confidence level corresponding to the at least one first candidate action proposal interval, wherein the action detection result comprises an action category and an action period, wherein the classifying target feature data corresponding to the at least one first candidate action proposal interval comprises processing, by using an action classification model, the target feature data corresponding to the at least one first candidate action proposal interval, so as to obtain the at least one classification confidence level corresponding to the at least one first candidate action proposal interval, and wherein the action classification model is obtained by training of a predetermined temporal action classification model using an output value, the output value determined based on a loss function according to a real action category, a predicted action category and an integrity evaluation value corresponding to a plurality of sample action segments, and the integrity evaluation value is for evaluating an integrity of the sample action segment.

2. The method according to claim 1, wherein the determining an action detection result for at least one action segment contained in the target resource according to the at least one classification confidence level corresponding to the at least one first candidate action proposal interval comprises:

determining a target classification confidence level corresponding to the at least one first candidate action interval according to the at least one classification confidence level corresponding to the at least one first candidate action proposal interval;

determining, from the at least one first candidate action proposal interval, at least one second candidate action proposal interval according to the target classification confidence level corresponding to the at least one first candidate action proposal interval;

obtaining, by using a first non-maximum suppression method, at least one third candidate action proposal interval according to the at least one second candidate action proposal interval; and determining the action detection result for the at least one action segment contained in the target resource according to the at least one third candidate action proposal interval and the action category indicated by the target classification confidence level corresponding to the at least one third candidate action proposal interval.

3. The method according to claim 2, wherein the determining, from the at least one first candidate action proposal interval, at least one second candidate action proposal interval according to the target classification confidence level corresponding to the at least one first candidate action proposal interval comprises determining, for each first candidate action proposal interval in the at least one of first candidate action proposal interval, the first candidate action proposal interval as the second candidate action proposal interval in response to a determination that the target classification confidence level corresponding to the first candidate action proposal interval is greater than or equal to a predetermined classification confidence level.

4. The method according to claim 2, wherein the determining, from the at least one first candidate action proposal interval, at least one second candidate action proposal interval according to the target classification confidence level corresponding to the at least one first candidate action proposal interval comprises:

ranking the target classification confidence level corresponding to the at least one first candidate action proposal interval, so as to obtain a ranking result; and determining the at least one second candidate action proposal interval from the at least one first candidate action proposal interval according to the ranking result.

5. The method according to claim 1, wherein the first candidate action proposal interval comprises a first candidate action start time point and a first candidate action end time point;

wherein the first candidate action proposal information further comprises a first confidence level corresponding to the first candidate action start time point and a second confidence level corresponding to the first candidate action end time point; and wherein the determining an action detection result for at least one action segment contained in the target resource according to the at least one classification confidence level corresponding to the at least one first candidate action proposal interval comprises:

obtaining at least one confidence level corresponding to the at least one first candidate action proposal interval according to the at least one classification confidence level corresponding to the at least one first candidate action proposal interval and an integrity confidence level corresponding to the at least one first candidate action proposal interval, wherein the integrity confidence level is determined according to the first confidence level and the second confidence level corresponding to the first candidate action proposal interval; and determining the action detection result for the at least one action segment contained in the target resource according to the at least one confidence level corresponding to the at least one first candidate action proposal interval.

6. The method according to claim 1, wherein the target resource comprises a target video; and wherein the performing a feature extraction on a plurality of target frame data of a target resource, so as to obtain at least one target feature data comprises:

performing an image feature extraction on a plurality of target video frame data of the target video, so as to obtain at least one target image feature data;

performing an audio feature extraction on the plurality of target video frame data of the target video, so as to obtain at least one target audio feature data; and merging the at least one target image feature data and the at least one target audio feature data to obtain the at least one target feature data.

7. The method according to claim 6, wherein the performing an image feature extraction on a plurality of target video frame data of the target video, so as to obtain at least one target image feature data comprises processing the plurality of target video frame data of the target video by using an image feature extraction model, so as to obtain the at least one target image feature data, wherein the image feature extraction model is obtained by training a predetermined video understanding model.

8. The method according to claim 1, wherein the performing a temporal action proposal on the at least one target feature data, so as to obtain at least one first candidate action proposal information comprises processing the at least one target feature data by using a temporal action proposal model, so as to obtain the at least one first candidate action proposal information.

9. The method according to claim 8, wherein the processing the at least one target feature data by using a temporal action proposal model, so as to obtain the at least one first candidate action proposal information comprises:

dividing the plurality of target frame data to obtain a plurality of target frame sequence data, wherein two adjacent target frame sequence data comprise a same target frame data;

performing a temporal action proposal on the target feature data corresponding to the plurality of target frame sequence data, so as to obtain at least one second candidate action proposal information corresponding to the plurality of target frame data; and obtaining the at least one first candidate action proposal information according to the at least one second candidate action proposal information corresponding to the plurality of target frame data.

10. The method according to claim 9, wherein the second candidate action proposal information comprises a third confidence level and a fourth confidence level, the third confidence level indicates a probability value that the target frame data is target frame data at an action start time point, and the fourth confidence level indicates a probability value that the target frame data is target frame data at an action end time point; and wherein the obtaining the at least one first candidate action proposal information according to the at least one second candidate action proposal information corresponding to the plurality of target frame data comprises:
> determining, from a plurality of time points corresponding to the plurality of target frame data, at least one initial action start time point and at least one initial action end time point according to the at least one third confidence level and the at least one fourth confidence level corresponding to the plurality of target frame data;
> performing a duration matching on the at least one initial action start time point and the at least one initial action end time point, so as to obtain at least one matching time point pair; and
> obtaining the at least one first candidate action proposal information according to the at least one matching time point pair.

11. The method according to claim 10, wherein the obtaining the at least one first candidate action proposal information according to the at least one matching time point pair comprises obtaining, by using a second non-maximum suppression method, the at least one first candidate action proposal information according to the at least one matching time point pair.

12. An electronic device, comprising:
> at least one processor; and
> a memory communicatively connected to the at least one processor, wherein the memory stores instructions executable by the at least one processor, the instructions, when executed by the at least one processor, are configured to cause the at least one processor to at least:
> perform a feature extraction on a plurality of target frame data of a target resource, so as to obtain at least one target feature data;
> perform a temporal action proposal on the at least one target feature data, so as to obtain at least one first candidate action proposal information, wherein the first candidate action proposal information comprises a first candidate action proposal interval;
> classify target feature data corresponding to the at least one first candidate action proposal interval, so as to obtain at least one classification confidence level corresponding to the at least one first candidate action proposal interval; and
> determine an action detection result for at least one action segment contained in the target resource according to the at least one classification confidence level corresponding to the at least one first candidate action proposal interval, wherein the action detection result comprises an action category and an action period,
> wherein the instructions, when executed by the at least one processor, are further configured to cause the at least one processor to:
> process, by use of an action classification model, the target feature data corresponding to the at least one first candidate action proposal interval, so as to obtain the at least one classification confidence level corresponding to the at least one first candidate action proposal interval,
> wherein the action classification model is obtained by training of a predetermined temporal action classification model using an output value, the output value determined based on a loss function according to a real action category, a predicted action category and an integrity evaluation value corresponding to a plurality of sample action segments, and the integrity evaluation value is for evaluating an integrity of the sample action segment.

13. The electronic device according to claim 12, wherein the instructions, when executed by the at least one processor, are further configured to cause the at least one processor to:
> determine a target classification confidence level corresponding to the at least one first candidate action interval according to the at least one classification confidence level corresponding to the at least one first candidate action proposal interval;
> determine, from the at least one first candidate action proposal interval, at least one second candidate action proposal interval according to the target classification confidence level corresponding to the at least one first candidate action proposal interval;
> obtain, by using a first non-maximum suppression method, at least one third candidate action proposal interval according to the at least one second candidate action proposal interval; and
> determine the action detection result for the at least one action segment contained in the target resource according to the at least one third candidate action proposal interval and the action category indicated by the target classification confidence level corresponding to the at least one third candidate action proposal interval.

14. The electronic device according to claim 13, wherein the instructions, when executed by the at least one processor, are further configured to cause the at least one processor to determine, for each first candidate action proposal interval in the at least one of first candidate action proposal interval, the first candidate action proposal interval as the second candidate action proposal interval in response to a determination that the target classification confidence level corresponding to the first candidate action proposal interval is greater than or equal to a predetermined classification confidence level.

15. The electronic device according to claim 12, wherein the first candidate action proposal interval comprises a first candidate action start time point and a first candidate action end time point;
> wherein the first candidate action proposal information further comprises a first confidence level corresponding to the first candidate action start time point and a second confidence level corresponding to the first candidate action end time point;
> wherein the instructions, when executed by the at least one processor, are further configured to cause the at least one processor to:
> obtain at least one confidence level corresponding to the at least one first candidate action proposal interval according to the at least one classification confidence level corresponding to the at least one first candidate action proposal interval and an integrity confidence level corresponding to the at least one first candidate action proposal interval, wherein the integrity confidence level is determined according to the first confidence level and the second confidence level corresponding to the first candidate action proposal interval; and
> determine the action detection result for the at least one action segment contained in the target resource according to the at least one confidence level corresponding to the at least one first candidate action proposal interval.

16. The electronic device according to claim 12, wherein the target resource comprises a target video; and wherein the instructions, when executed by the at least one processor, are further configured to cause the at least one processor to:
perform an image feature extraction on a plurality of target video frame data of the target video, so as to obtain at least one target image feature data;
perform an audio feature extraction on the plurality of target video frame data of the target video, so as to obtain at least one target audio feature data; and
merge the at least one target image feature data and the at least one target audio feature data to obtain the at least one target feature data.

17. The electronic device according to claim 12, wherein the instructions, when executed by the at least one processor, are further configured to cause the at least one processor to:
divide the plurality of target frame data to obtain a plurality of target frame sequence data, wherein two adjacent target frame sequence data comprise a same target frame data;
perform a temporal action proposal on the target feature data corresponding to the plurality of target frame sequence data, so as to obtain at least one second candidate action proposal information corresponding to the plurality of target frame data; and
obtain the at least one first candidate action proposal information according to the at least one second candidate action proposal information corresponding to the plurality of target frame data.

18. The electronic device according to claim 17, wherein the second candidate action proposal information comprises a third confidence level and a fourth confidence level, the third confidence level indicates a probability value that the target frame data is target frame data at an action start time point, and the fourth confidence level indicates a probability value that the target frame data is target frame data at an action end time point; and
wherein the instructions, when executed by the at least one processor, are further configured to cause the at least one processor to:
determine, from a plurality of time points corresponding to the plurality of target frame data, at least one initial action start time point and at least one initial action end time point according to the at least one third confidence level and the at least one fourth confidence level corresponding to the plurality of target frame data;
perform a duration matching on the at least one initial action start time point and the at least one initial action end time point, so as to obtain at least one matching time point pair; and
obtain the at least one first candidate action proposal information according to the at least one matching time point pair.

19. A non-transitory computer-readable storage medium having computer instructions therein, the computer instructions configured to cause a computer system to at least:
perform a feature extraction on a plurality of target frame data of a target resource, so as to obtain at least one target feature data;
perform a temporal action proposal on the at least one target feature data, so as to obtain at least one first candidate action proposal information, wherein the first candidate action proposal information comprises a first candidate action proposal interval;
classify target feature data corresponding to the at least one first candidate action proposal interval, so as to obtain at least one classification confidence level corresponding to the at least one first candidate action proposal interval; and
determine an action detection result for at least one action segment contained in the target resource according to the at least one classification confidence level corresponding to the at least one first candidate action proposal interval, wherein the action detection result comprises an action category and an action period,
wherein the computer instructions are further configured to cause the computer system to at least:
process, by use of an action classification model, the target feature data corresponding to the at least one first candidate action proposal interval, so as to obtain the at least one classification confidence level corresponding to the at least one first candidate action proposal interval,
wherein the action classification model is obtained by training of a predetermined temporal action classification model using an output value, the output value determined based on a loss function according to a real action category, a predicted action category and an integrity evaluation value corresponding to a plurality of sample action segments, and the integrity evaluation value is for evaluating an integrity of the sample action segment.

20. The medium according to claim 19, wherein the computer instructions are further configured to cause the computer system to at least:
determine a target classification confidence level corresponding to the at least one first candidate action interval according to the at least one classification confidence level corresponding to the at least one first candidate action proposal interval;
determine, from the at least one first candidate action proposal interval, at least one second candidate action proposal interval according to the target classification confidence level corresponding to the at least one first candidate action proposal interval;
obtain, by use of a first non-maximum suppression method, at least one third candidate action proposal interval according to the at least one second candidate action proposal interval; and
determine the action detection result for the at least one action segment contained in the target resource according to the at least one third candidate action proposal interval and the action category indicated by the target classification confidence level corresponding to the at least one third candidate action proposal interval.

* * * * *